Nov. 3, 1964     D. C. LANDGRAF     3,155,288

FERTILIZER DISTRIBUTOR

Filed June 28, 1962

David C. Landgraf

INVENTOR.

BY *Clarence A. O'Brien*
and *Harvey B. Jacobson*
                                 Attorneys

United States Patent Office 3,155,288
Patented Nov. 3, 1964

3,155,288
FERTILIZER DISTRIBUTOR
David C. Landgraf, Rte. 1, Box 81, Madill, Okla.
Filed June 28, 1962, Ser. No. 205,963
2 Claims. (Cl. 222—227)

This invention relates to a novel and useful distributor which may be used very efficiently in distributing fertilizer as well as other substances.

Because of different fertilizers used, ground conditions and the fertilizer requirement of various types of crops, a fertilizer distributor must be capable of dispensing or discharging fertilizer at varying rates. Accordingly, it is the main object of this invention to provide a fertilizer distributor which will be capable of being adjusted so as to distribute fertilizer at varying rates.

A further object of this invention, in accordance with the immediately preceding object, is to provide a fertilizer distributor which, when adjusted to deliver or discharge fertilizer at a given rate, will in fact discharge the fertilizer at that predetermined rate consistently and without fluctuation in the rate of discharge of fertilizer so that the adjusted rate of discharge is not merely an average rate of discharge.

Still another object of this invention is to provide a distributor in accordance with the preceding objects including a hopper for the reception of fertilizer from which substantially all of the fertilizer within the hopper may be discharged at a predetermined rate even when the hopper is almost empty.

Still another object of this invention is to provide a fertilizer distributor in accordance with the preceding objects which is constructed in a manner whereby the rate of discharge effected by the distributor may be readily adjusted.

Another object of this invention is to provide a fertilizer distributor including simplified agitator means whereby the fertilizer disposed within the hopper adjacent the discharge opening thereof may be continually agitated so as to maintain a constant rate of discharge from the hopper.

A further object of this invention to be specifically enumerated herein is to provide a fertilizer distributor constructed in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
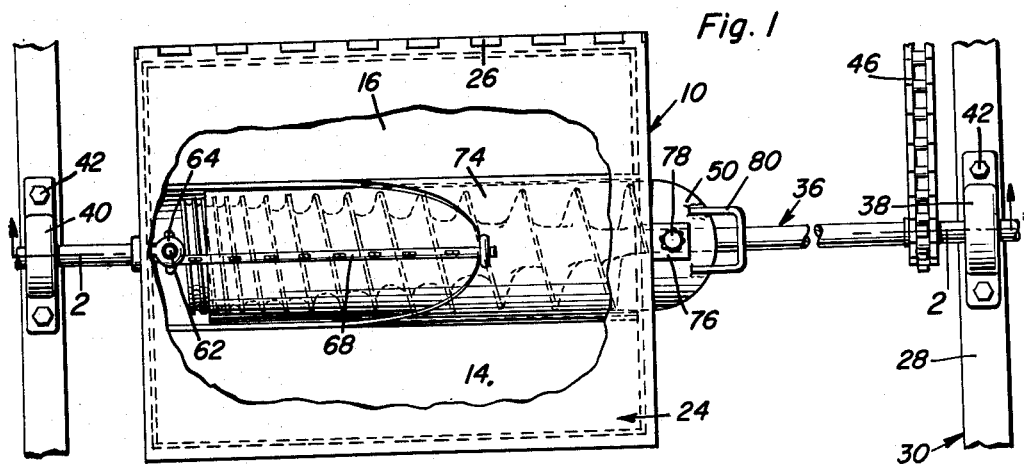
FIGURE 1 is a top plan veiw of the fertilizer distributor of the instant invention shown with parts thereof being broken away and shown in section and with the fertilizer distributor mounted within a suitable mobile frame and drive means in the form of an endless flexible chain drivingly connected to the screw-type conveyor shaft of the fertilizer distributor.
Figure 2:
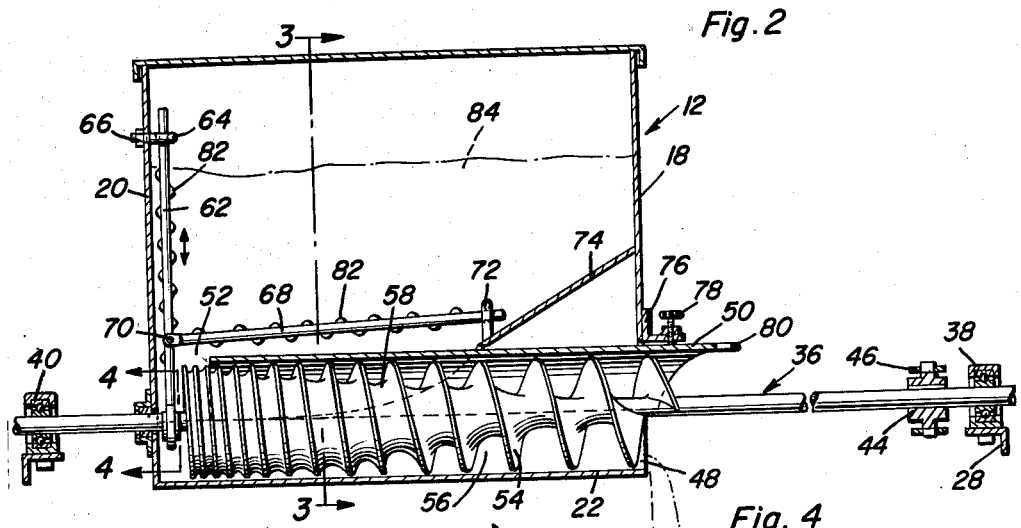
FIGURE 2 is a vertical longitudinal sectional view taken substantially upon a plane indicated by section line 2—2 of FIGURE 1.
Figure 3:
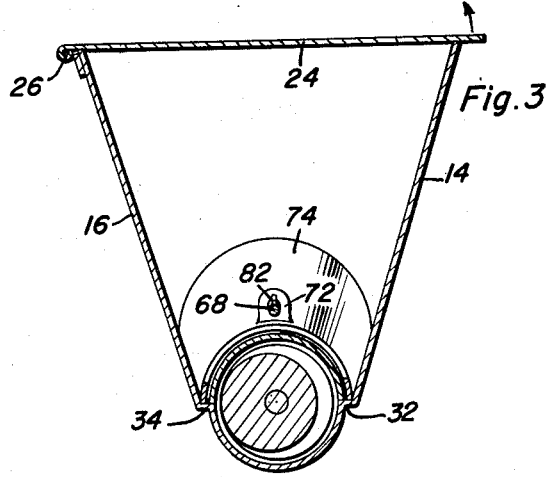
FIGURE 3 is a transverse vertical sectional view taken substantially upon a plane indicated by section line 3—3 of FIGURE 2.
Figure 4:
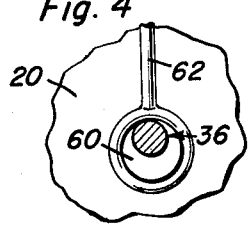
FIGURE 4 is an enlarged fragmentary transverse vertical sectional view taken substantially upon a plane indicated by section line 4—4 of FIGURE 2.

Referring now more specifically to the drawings, the numeral 10 generally designates the fertilizer distributor of the instant invention. The fertilizer distributor includes an open topped hopper generally referred to by the reference numeral 12 which includes opposite side walls 14 and 16, opposite end walls 18 and 20, and a bottom wall 22. A closure cover generally referred to by the reference numeral 24 is hingedly secured along one edge by means of a hinge construction 26 to the upper edge of the side wall 16 and may be swung into and out of a closed position overlying the upper end of the hopper 12.

The hopper 12 may be supported from the frame 28 of a supporting vehicle generally referred to by the reference numeral 30 in any convenient manner.

It will be noted that the opposite side walls 14 and 16 are downwardly convergent and that the bottom wall 22 is generally semi-cylindrical and includes a pair of laterally outwardly directed flanges 32 and 34 to whose outer end portions the lower ends of the side walls 14 and 16 are secured in any convenient manner.

A screw-type conveyor shaft generally referred to by the reference numeral 36 is provided and its opposite ends are rotatably supported in bearing assemblies 38 and 40 supported from the frame 28 by means of fasteners 42. A sprocket wheel 44 is fixedly secured to one end of the shaft 36 and an endless chain 46 is entrained about the sprocket wheel 44 and may be connected to any suitable driving shaft for effecting rotation of the shaft 36 either independently of or in direct response to movement of the vehicle 30.

The end of the shaft 36 to which the sprocket wheel 44 is secured projects outwardly of the end wall 18 of the hopper 12 through an opening 48 formed in the end wall 18. The opening 48 is substantially circular although the radius of the upper half thereof is slightly greater than the radius of the lower half thereof in order that the adjacent end of an elongated generally semi-cylindrical closure and metering baffle plate 50 may also project outwardly of the opening 48.

The baffle plate has its opposite longitudinal side edges disposed in abutting relation with the upper surfaces of the laterally outwardly directed flanges 32 and 34 and is slidable axially of the shaft 36 to define a discharge throat or opening 52 between the end of the baffle plate 50 remote from the opening 48 and the adjacent end wall 20 of the hopper 12.

Helical screw threads 54 are secured to the shaft 36 and it will be noted that the helical path 56 defined between the threads 54 increases in transverse cross sectional area toward the opening 48. The end of the shaft 36 disposed within the hopper 12 includes a generally cone-shaped portion 58 on which the threads 54 are formed. The cone-shaped portion 58 tapers toward the opening 48 and the distance between the threads 54 gradually increases toward the opening 48.

The shaft 36 includes an eccentrically disposed crank pin 60 and the lower end of an upstanding agitator shaft 62 is rotatably journalled on the crank pin 60. The upper end of the agitator shaft 62 is slidably received in an eye member 64 secured to the end wall 20 of the hopper 12 by means of a fastener 66 and a second generally horizontally disposed agitator shaft 68 has one end pivotally secured to the portion of the agitator shaft 62 disposed above the baffle plate 50 by means of a pivot pin 70. The outer end of the horizontal agitator shaft 68 is slidably received through an eye member 72 supported from the inclined member 74 which is secured within the end of the hopper 12 adjacent the end wall 18 thereof and is inclined downwardly toward the discharge throat or opening 52.

An L-shaped bracket 76 is mounted on the end wall 18 of the hopper in any convenient manner and includes a setscrew 78 which may be engaged with the upper surface of the center portion of the baffle plate 50 in order to secure the baffle plate 50 in adjusted shifted positions axially of the shaft 36 in order to vary the throat or discharge opening 52. The baffle plate 50 includes a U-shaped handle 80 whereby it may be readily shifted longitudinally of the housing 12 and each of the agitator shafts 62 and 68 includes radially outwardly projecting projections 82 for effecting a greater agitation of the fertilizer 84 disposed within the hopper.

In operation, as the shaft 36 is rotated by means of the endless chain 46, the baffle plate 50 may be adjusted as desired to define the desired discharge throat or opening 52. Then, as the shaft 36 rotates, the agitator shafts 62 and 68 will agitate the fertilizer 84 within the hopper 12 and portions of the fertilizer 84 will drop downwardly through the discharge throat or opening 52 and be seated between the threads 54 of the conveyor shaft 36. Continued rotation of the shaft 36 will of course shift the fertlizer entrapped between the threads 54 adjacent the discharge opening 52 toward the outlet opening 48. If it is desired to increase the discharge of fertilizer 84 from the hopper 12, the baffle plate 50 may be adjusted so that the end thereof to which the handle 80 is secured projects further outwardly of the housing 18. In this manner, more of the threads 54 are brought in registry with the enlarged discharge throat or opening 52 and the conveyor shaft 36 thereby will discharge a greater amount of fertilizer for a given number of revolutions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A distributor comprising a hopper including upstanding side walls interconnected by an upwardly opening partial cylindrical bottom wall, a constant diameter screw-type conveyor shaft disposed over and closely embraced by said bottom wall and journaled for rotation about its longitudinal axis, at least one of said side walls having outlet opening means formed therein with which one end portion of said screw-type conveyor shaft is registered, drive means drivingly connected to said conveyor shaft, and downwardly opening partial cylindrical baffle means disposed over and closely embracing the upper portion of said conveyor shaft and mounted for movement in said hopper axially of said shaft, said bottom wall and baffle means substantially enclosing the portion of said shaft disposed in a generally cylindrical delivery chamber defined between said bottom wall and said baffle means and coacting with a portion of at least two of said hopper side walls to form a discharge opening adjacent said other end portion of said shaft between said chamber and the portion of said hopper disposed above said baffle means, which opening may be varied in size in response to shifting of said baffle means axially of said shaft, said screw shaft including helical screw threads defining a helical discharge path therebetween that progressively decrease in cross-sectional area from said one end of said shaft toward the other end thereof, said shaft including an eccentrically disposed crank pin, an upright agitator shaft having its lower end journalled on said crank pin and projecting upwardly through said discharge opening and into the upper portion of said hopper disposed above said baffle means, and means in the upper portion of said hopper slidably guiding an upper end portion of said agitator shaft.

2. The distributor of claim 1 including a generally horizontally disposed agitator shaft having one end pivotally secured to the portion of said upright shaft disposed in said portion of said hopper for rotation about a generally horizontally disposed axis extending transversely of said conveyor and horizontal shafts and disposed above said baffle means, and guide means in said upper portion of said hopper slidably guiding said other end of said horizontal agitator shaft.

References Cited in the file of this patent

UNITED STATES PATENTS

| | | |
|---|---|---|
| 102,997 | Whelpley et al. | May 10, 1870 |
| 135,846 | Reames | Feb. 11, 1873 |
| 733,628 | Cramer | July 14, 1903 |
| 932,062 | Schmid | Aug. 24, 1909 |
| 1,467,951 | Rosenberger | Sept. 11, 1923 |
| 1,808,804 | Baldner et al. | June 9, 1931 |
| 1,880,840 | Currier | Oct. 4, 1932 |
| 1,887,881 | Blattner | Nov. 15, 1932 |
| 2,056,239 | Walter | Oct. 6, 1936 |